United States Patent [19]

Hasegawa et al.

[11] Patent Number: 4,780,604
[45] Date of Patent: Oct. 25, 1988

[54] IC-INCORPORATED MEMORY CARD

[75] Inventors: Haruyoshi Hasegawa; Koji Kagaya, both of Kawasaki, Japan

[73] Assignee: Kabushiki Kaisha Toshiba, Kawasaki, Japan

[21] Appl. No.: 15,613

[22] Filed: Feb. 17, 1987

[30] Foreign Application Priority Data

Feb. 21, 1986 [JP] Japan .................................. 61-36665

[51] Int. Cl.$^4$ ........................................... G06K 19/06
[52] U.S. Cl. .................................. 235/492; 235/441; 361/220; 365/53
[58] Field of Search ......................... 235/492; 174/51; 361/220, 221; 365/52, 53

[56] References Cited

U.S. PATENT DOCUMENTS 1,093,491  4/1914  Smith .................................... 361/221
4,179,178 12/1979  Bachman et al. ............... 361/220 X
4,223,368  9/1980  Dattilo .................................. 361/220

FOREIGN PATENT DOCUMENTS 59-70262  5/1984  Japan .

Primary Examiner—David L. Trafton
Attorney, Agent, or Firm—Cushman, Darby & Cushman

[57] ABSTRACT

A memory card includes a card body having an integrated circuit incorporated therein, and having a plurality of internal and external electric signal-connection terminals. The respective terminals of the integrated circuit are electrically connected to a plurality of electric signal-carrying members. The electric signal-carrying members have contact terminals for electrical connection to a card information-processing unit. The contact terminals are exposed on the upper surfce of the card body. The memory card has a protective cover which is slidably movable in two predetermined directions on the card surface. When the memory card is in use, the protective cover is movable in one of the two predetermined directions, whereby the respective contact terminals are exposed, and when the memory card is not being used, it is movable in the other direction, whereby it covers the respective contact terminals. The protective cover has a surface which faces the card body. The protective cover also has a short-circuiting member for electrically short-circuiting the respective contact terminals at the facing surface side of the protective cover, when the protective cover covers the respective contact terminals.

10 Claims, 8 Drawing Sheets

IC-INCORPORATED MEMORY CARD

BACKGROUND OF THE INVENTION

This invention relates to an IC (integrated circuit)-incorporated memory card known as an IC card and, in particular, to a memory card equipped with an IC including a memory element, such as a ROM (read-only memory) or RAM (random-access memory), and a control element, such as a CPU (central processing unit).

An IC card has been recently developed which comprises a card body having an IC incorporated therein. This IC includes a memory element, such as a ROM or RAM, and a control element, such as a CPU. This type of IC includes a plurality of terminals for permitting the internal and external transfer of electric signals. The respective IC terminals are electrically connected to a plurality of electric signal-carrying members which possess contact terminals for electrical connection to a card information processing unit.

Since the contact terminals of this type of IC card are exposed on the surface of the card body, it is necessary to protect them from adverse environmental factors, such as contamination, dirt, static electricity, etc. Japanese Utility Model Disclosure (Kokai) No. 59-70262, for example discloses this type of an IC card having a protective cover which allows the respective contact terminals to be exposed when the IC card is in use and covers them when the card is not being used.

The aforementioned protective cover is sufficient to protect the contact terminals from contamination, dirt, and dust, but cannot protect them from static electricity. That is, this protective cover is usually of such a type that the insulation distance between the end of the cover and the respective contact terminals is insufficient. Therefore, even if the contact terminals are covered by the protective cover, there is a risk that when the user's hand touches that portion of the card body, for example, in the neighborhood of the protective cover, a discharge will occur at the contact terminal, through a clearance between the cover end and the card body, due to the static electricity on the user's body. This may cause breakdown of the IC within the IC card.

SUMMARY OF INVENTION

It is accordingly the object of the present invention to provide a memory card which can be made substantially free from the effects of external static electricity.

According to an aspect of the present invention, there is provided a memory card for use in a card information-processing unit to allow the information contained in the card to be processed, comprising a card body, at least one integrated circuit incorporated in the card body and having a plurality of internal and external signal-connection terminals, a plurality of electric signal-carrying members electrically connected to respective terminals of the integrated circuit, and having contact terminals for electrical connection to the card information-processing unit, the contact terminals being exposed in a predetermined pattern on a portion of the main surface of the card body, a protective cover having a surface facing the main surface of the card body, and being slidably movable in two predetermined directions thereon, so that, by being movable in one direction, the respective contact terminals may be exposed when the memory card is in use, and being movable in the other direction, the respective contact terminals may be covered when the memory card is not being used, and short-circuiting means provided on the surface of the protective cover, for electrically short-circuiting the respective contact terminals with respect to each other when the protective cover covers the respective contact terminals.

In the memory card of the present invention, the short-circuiting member is slidably movable on the main surface of the card body, with the result that the contact terminals may be electrically short-circuited when the memory card is not in use, and may be open-circuited only when the memory card is being used.

For this reason, when the memory card is not being used, the contact terminals are electrically short-circuited, and thus are all at the same potential level. This specific arrangement is less liable to be affected by external static electricity than in the case where the contact terminals are not short-circuited. As a result, the internal integrated circuit can be protected from damage caused by external static electricity.

DETAILED DESCRIPTION OF THE PREFERRED EMBODIMENTS

The memory card according to the embodiment of the present invention will be explained below, with reference to the accompanying drawing sheets.

Figure 1:
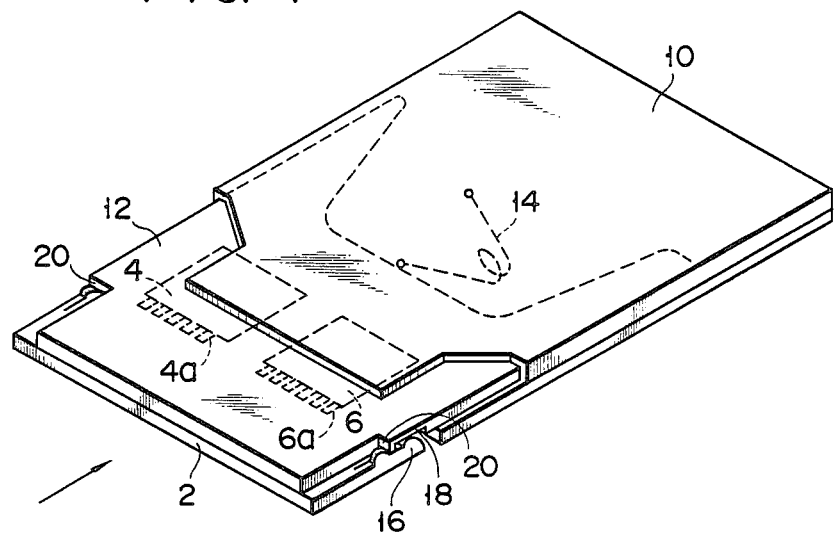
FIG. 1 is a perspective view of a memory card according to one embodiment of the present invention.
Figure 2:
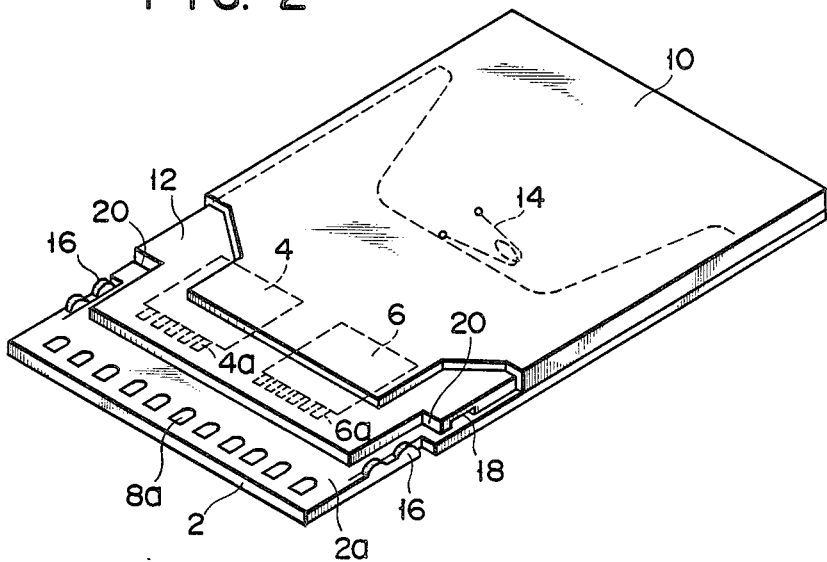
FIG. 2 is a perspective view showing the memory card with a protective cover displaced.

FIGS. 1 and 2 show an example of the IC-incorporated memory card according to the embodiment of the present invention. IC 4 having a memory element, such as a ROM or RAM, and IC 6 having a control element, such as a CPU, are incorporated in card body 2. ICs 4 and 6 have contact terminals 4a and 6a, respectively, for allowing the internal and external transmission of external signals. Respective terminals 4a and 6a are electrically connected to a plurality of electric signal-carrying members 8 (see FIG. 4) which have contact terminals 8a for electric connection to a card information-processing unit (not shown). Contact terminals 8a are exposed on upper surface 2a of card body 2. Cover 10 is mounted relative to upper surface 2a of card body 2, with a predetermined spacing left therebetween, noting that the aforementioned spacing corresponds to the thickness of protective cover 12, as will be set out below. Cover 10 is mounted such that it wholly covers upper surface 2a of card body 2, except for an area of contact terminals 8a. Cover 10 may be formed either integral with, or separately from, card body 2.

Figure 12:
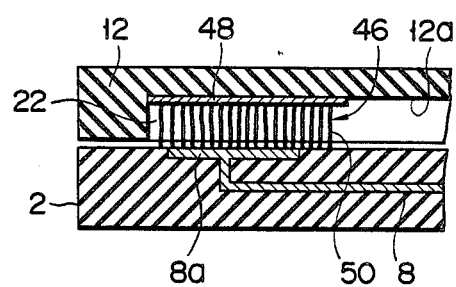
FIG. 12 is a cross-sectional view of the fourth modified form of the short-circuiting member shown in FIG. 11.

Provided between card body 2 and cover 10 is protective cover 12, for example, a nonconductive sheet-like member, which slides in the direction indicated by the arrow shown in FIG. 1. Protective cover 12 is normally located so that it covers contact terminals 8a, as shown in FIG. 1, when the IC card is not being used, in order to protect them from the external environment. When the IC card is to be used, however, protective cover 12 is shifted to a position whereby contact terminals 8a are exposed, as is shown in FIG. 2. Spring 14 is positioned on cover 10 such that it is fixed at one end to card body 2 and at the other end to protective cover 12. Protective cover 12 is held, under the action of spring 14, in the state shown in FIG. 1. If, when in this state, protective cover 12 is slidably displaced, under the action of spring 14, in the direction indicated by the arrow in FIG. 1, then protective cover 12 is moved to expose contact terminals 8a, as is shown in FIG. 12.

Projections 16 are provided one pair at each side edge of the upper surface of the forward end portion of card body 2, and recesses 18 are formed one at each forward side edge portion of the bottom surface of protective cover 12, to allow projections 16 to be snap-fitted into associated recesses 18 when protective cover 12 is located in the position shown in FIG. 1. Thus, when the IC card is not being used, protective cover 12 is held in the position shown in FIG. 1, so as to prevent it from being displaced inadvertently.

Steps 20 are formed at the respective forward side portions of protective cover 12, so that they can be brought into abutting engagement with associated projections (not shown) of a card insertion slit of an external device (not shown), when the IC card is inserted thereinto. Stated in more detail, in the state as shown in FIG. 1, the IC card is inserted into the card-insertion slit, and when it reaches the predetermined position where the aforementioned associated projections are located, steps 20 of protective cover 12 are in abutment with the corresponding associate projections provided within the card insertion slit. When the IC card is pushed further forward, projections 16 of card body 2 are moved ahead, beyond recesses 18 of protective cover 12, causing the protective cover to be displaced in the direction of the arrow shown in FIG. 1, to thereby permit contact terminals 8a on card body 2 to be exposed. With the IC card thus having been moved to its prescribed position, spring terminals (not shown) provided within the card-insertion slit are brought into contact with contact terminals 8a on card body 2. When the IC card is to be withdrawn from the card-insertion slit, after usage, it is drawn back to a position where steps 20 of protective cover 12 are brought out of abutment with the projections provided within the card-insertion slit. Upon further withdrawal of the IC card from the card-insertion slit, protective cover 12 automatically regains its original position, due to the action of spring 14, at which time projections 16 of card body 2 snap-fit into recesses 18 of protective cover 18. As a result, when the IC card is completely withdrawn from the card-insertion slit, contact terminals 8a are again covered by protective cover 12, as shown in FIG. 1.

Figure 3:
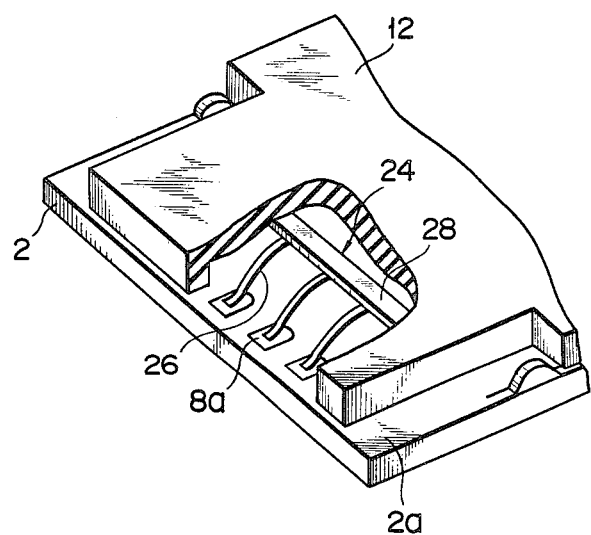
FIG. 3 is a perspective view, partly cutaway and partly in section, showing the memory card of FIG. 1.
Figure 4:
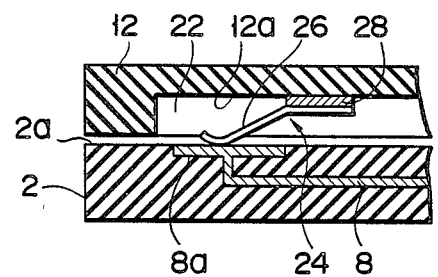
FIG. 4 is a cross-sectional view, partly cutaway, showing the memory card of FIG. 1.

FIGS. 3 and 4 show in detail an internal arrangement of protective cover 12. Recess 22 is formed at buttom surface 12a of protective cover 12, and, at the very least, corresponds to contact terminals 8a, as can be appreciated from FIG. 1. Short-circuiting member 24 is provided within recess 22, and is adapted to electrically short-circuit respective contact terminals 8a when protective cover 12 is in the state shown in FIG. 1. Short-circuiting member 24 includes a plurality of leaf spring-like, electroconductive contact terminals 26 and an electroconductive member 28. The respective contact terminals 26, when being located opposite to corresponding contact terminals 8a, are in independent electrical contact with their corresponding contact terminals 8a. Contact terminals 26 are welded at their rear ends to electroconductive member 28 which electrically short-circuits members 26. Short-circuiting member 24 is fixed by electroconductive member 28 to protective cover 12, so that member 24 may be moved together with cover 12. Short-circuiting member 24 short-circuits contact terminals 8a, as shown in FIG. 3, when protective cover 12 is in the state shown in FIG. 1, and open-circuits contact terminals 8a when short-circuiting member 24 is moved to the position shown in FIG. 2.

In the aforementioned memory card thus arranged, contact terminals 8a are short-circuited when the IC card is not being used, so that they are all placed at the same potential level. This particular arrangement is less liable to be influenced by the effects of external static electricity than when contact terminals 8a are not short-circuited. As a result, internal ICs 4 and 6 can be protected from possible damage caused by external static electricity.

Figure 5:
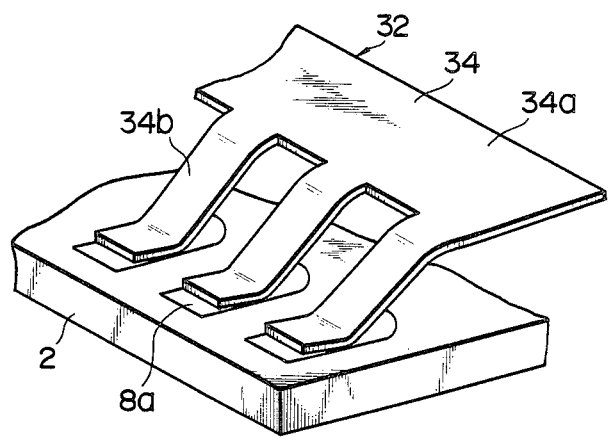
FIG. 5 is a perspective view showing a first modified form of a short-circuiting member of the memory card.
Figure 6:
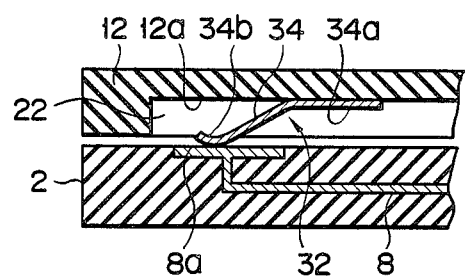
FIG. 6 is a cross-sectional view of the first modified form of the short-circuiting member FIG. 5.

FIGS. 5 and 6 show a first modified form of the short-circuiting member. Short-circuiting member 32 includes spring member 34 which is formed of electroconductive material and is comprised of electroconductive section 34a and a plurality of contact terminals 34b. Electroconductive section 34a of short-circuiting member 32 is attached to bottom surface 12a of protective cover 12, and the plurality of contact terminals 34b extend from electroconductive section 34a and, when protective cover 12 covers contact terminals 8a, are in contact with contact terminals 8, whereby contact terminals 8a are short-cruited.

Figure 7:
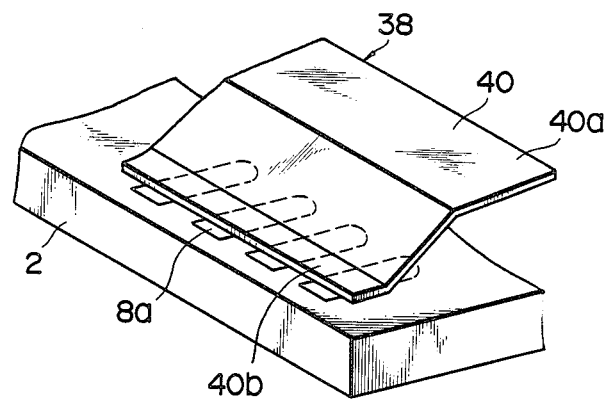
FIG. 7 is a perspective view showing a second modified form of the short-circuiting member of the memory card.
Figure 8:
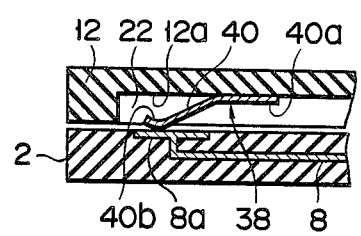
FIG. 8 is a cross-sectional view of the second modified form of the short-circuiting member shown in FIG. 7.

FIGS. 7 and 8 show a second modified form of the short-circuiting member. Short-circuiting member 38 has leaf spring-like member 40 which is formed of electroconductive material. Member 40 is comprised of attachment end edge section 40a and contact end edge section 40b. Attachment end edge section 40a is attached to bottom surface 12a of protective cover 12 and, when protective cover 12 covers contact terminal 8a, are placed in contact with contact terminal 8a, whereby contact terminals 8a are short-circuited.

Figure 9:
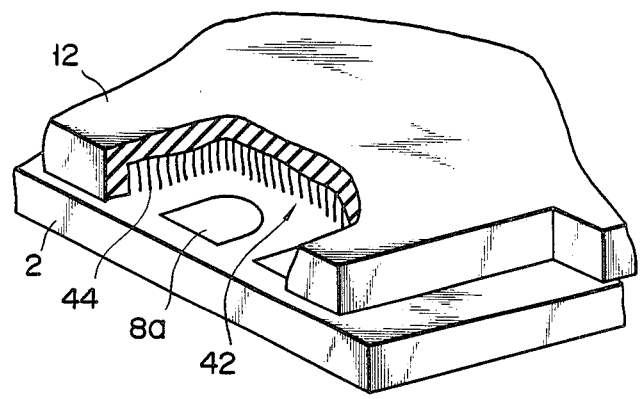
FIG. 9 is a perspective view showing a third modified form of the short-circuiting member of the memory card.
Figure 10:
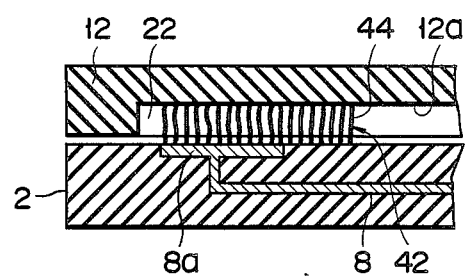
FIG. 10 is a cross-sectional view of the third modified form of the short-circuiting member shown in FIG. 9.

FIGS. 9 and 10 show a third modified form of the short-circuiting member. In short-circuiting member 42, protective cover 12 is formed of electroconductive member, such as a metal, and a greater number of electroconductive piles 44 are attached to bottom surface 12a of recess 22 of protective cover 12. When protective cover 12 covers contact terminals 8a, piles 44 are in contact with contact terminals 8a, whereby contact terminals 8a are short-circuited.

Figure 11:
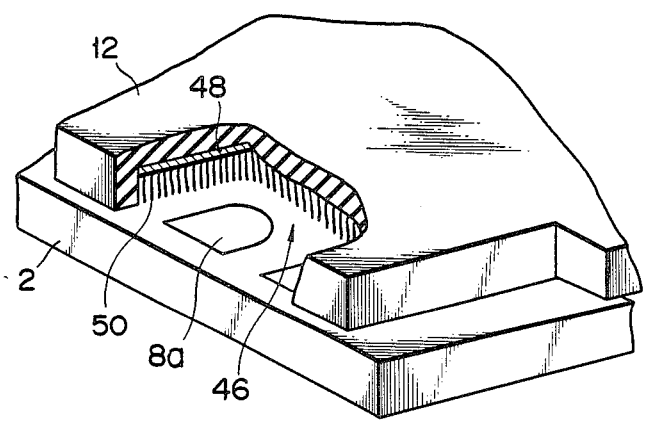
FIG. 11 is a perspective view showing a fourth modified form of the short-circuiting member.

FIGS. 11 and 12 show a fourth modified form of the short-circuiting member. In short-circuiting circuit 46, protective cover 12 is formed of a nonconductive member and, on bottom surface 12a of recess 22 of cover 12, electroconductive material is coated, painted, or plated, to thereby form electroconductive layer 48 with electroconductive piles 50 attached thereto. When contact terminals 8a are covered by protective cover 12, piles 50 are in contact with contact terminals 8a, whereby contact terminals 8a are short-circuited.

Figure 13:
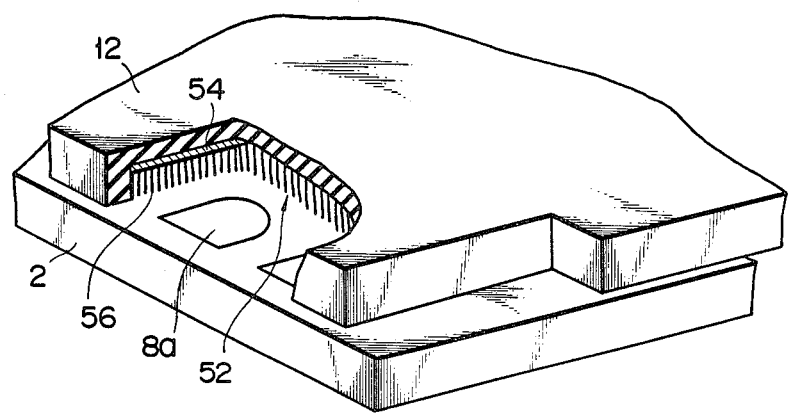
FIG. 13 is a perspective view showing a fifth modified form of the short-circuiting member of the memory card.
Figure 14:
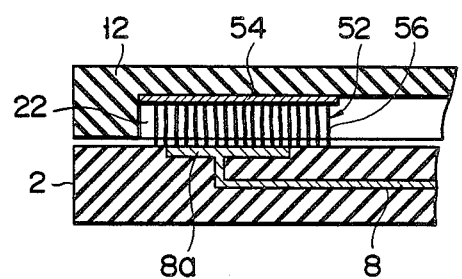
FIG. 14 is a cross-sectional view of the fifth modified form of the short-circuiting member shown in FIG. 13.

FIGS. 13 and 14 show a fifth modified form of the short-circuiting member. In short-circuiting member 52, electroconductive piles 56 are attached by electroconductive adhesive 54 to bottom surface 12a of recess 22 of protective cover 12. Piles 56 are placed in contact with contact terminals 8a when protective cover 12 covers contact terminals 8a, whereby contact terminals 8a are short-circuited.

Figure 15:
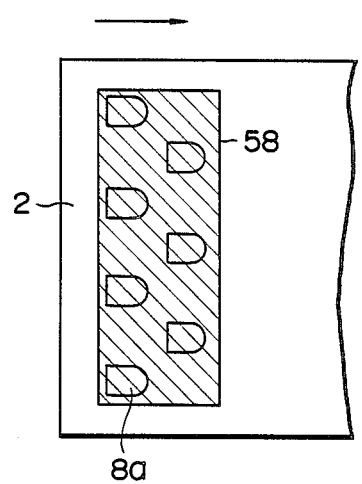
FIGS. 15 and 16 respectively show a view of a pattern corresponding to a rectangular pile array on the third to fifth modifications of the short-circuiting member of the memory card.
Figure 16:
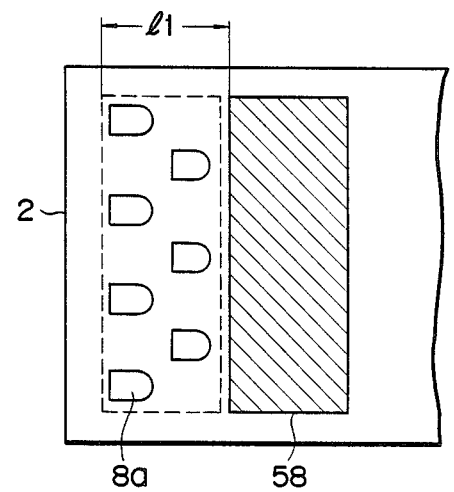
Figure 17:
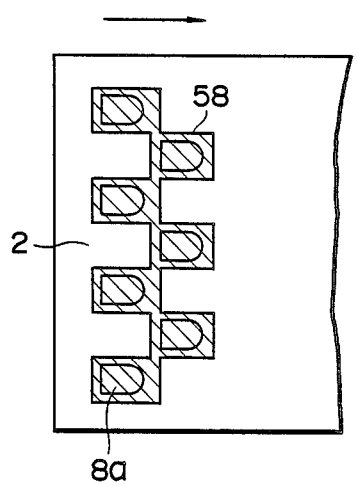
FIGS. 17 and 18 respectively show a view of a pattern corresponding to an alternately staggered or offset pile array on the third to fifth modifications of the short-circuiting member of the memory card.
Figure 18:
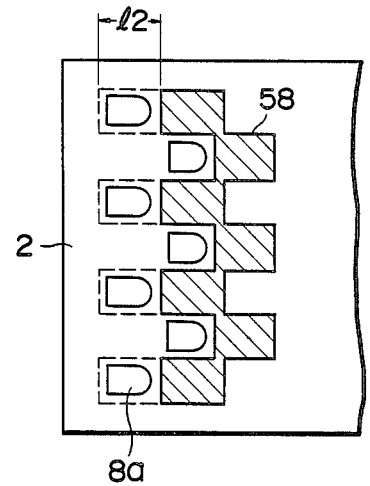

In the modifications of FIGS. 3 to 5, respective piles 44, 50, and 56 may be so formed as to provide rectangular pattern 58 covering a complete array of respective contact terminals 8a, as shown in FIGS. 15 and 16, or to provide alternately staggered or offset pattern 58 covering a complete array of respective contact patterns 8a, as shown in FIGS. 17 and 18. In the alternately staggered or offset pattern 58, as shown in FIGS. 17 and 18, for example, it is necessary only to move protective cover 12 over a shorter distance than in the case of the array shown in FIGS. 15 and 16. That is, $$l1 > l2$$

where
l1 signifies the moving distance for the array of FIGS. 15 and 16; and
l2 signifies the moving distance for the array of FIGS. 17 and 18.

What is claimed is:
1. A memory card for use in a card information-processing unit, to allow information contained in the card to be processed, comprising:
a card body having a main surface;
at least one integrated circuit incorporated in the card body, and having a plurality of internal and external signal-connection terminals;
a plurality of electric signal-carrying members electrically connected to respective terminals of the integrated circuit, and having contact terminals for electrical connection to the card information-processing unit, the contact terminals being exposed in a predetermined pattern on the main surface of the card body;
a protective cover having a surface facing the main surface of the card body, and being slidably movable in two predetermined directions on the main surface of the card body, the protective cover being movable in one of the two directions, so that when the memory card is being used, the respective contact terminals may be exposed, and being movable in the other direction, so that when the memory card is not being used, the respective contact terminals may be covered; and
short-circuiting means provided on the surface of the protective cover, for electrically short-circuiting the respective contact terminals when the protective cover covers the respective contact terminals.

2. The memory card according to claim 1, wherein said short-circuiting means is comprised of an electroconductive member attached to that surface of said protective cover which faces the contact terminals, and a plurality of leaf spring-like contact terminals of electroconductive material which are brought into contact with the contact terminals when said protective cover covers the contact terminals.

3. The memory card according to claim 2, wherein said respective contact terminals are welded to said electroconductive member.

4. The memory card according to claim 1, wherein said short-circuiting means has an electroconductive spring member comprised of an electroconductive portion attached to the facing surface of the protective cover, and a plurality of contact terminal portions extending from the electroconductive portion, and adapted to be brought into contact with said contact terminals when said protective cover covers said contact terminals.

5. The memory card according to claim 1, wherein said short-circuiting means has a leaf spring-like member of electroconductive material, which is comprised of an attachment end edge portion attached to the facing surface of said protective cover, and a contact end edge portion adapted to be brought into contact with said respective contact terminals when said protective cover covers said contact terminals.

6. The memory card according to claim 1, wherein said protective cover is made of electroconductive material, and said short-circuiting member includes electroconductive piles attached to said protective cover, and adapted to be brought into contact with said contact terminals when said protective cover covers said contact terminals.

7. The memory card according to claim 6, wherein said electroconductive piles are attached to said protective cover, in a pattern corresponding to a particular array of said contact terminals.

8. The memory card according to claim 1, wherein said protective cover is made of nonconductive material, and said short-circuiting means is comprised of an electroconductive portion coated as an electroconductive layer on said facing surface of said protective cover and electroconductive piles attached to said electroconductive layer, and adapted to be brought into contact with said contact terminals when said protective cover covers said contact terminals.

9. The memory card according to claim 1, wherein said short-circuiting means is comprised of a number of electroconductive piles adapted to be brought into contact with said contact terminals when said protective cover covers said contact terminals, and an electroconductive adhesive for bonding the electroconductive piles to the facing surface of said protective cover, so that the electroconductive piles may be short-circuited.

10. The memory card according to claim 1, wherein said at least one integrated circuit includes at least one of a memory element, such as a read-only memory or a random-access memory, and a control element, such as a central processing unit.

* * * * *